United States Patent [19]
Kielma et al.

[11] 3,760,472
[45] Sept. 25, 1973

[54] SPINDLE CHANGE MECHANISM FOR A MULTIPLE SPINDLE HEAD MACHINE

[75] Inventors: Ervin J. Kielma; Albin J. Schabowski, both of Milwaukee, Wis.

[73] Assignee: Kearney & Trecker Corporation, West Allis, Wis.

[22] Filed: Feb. 17, 1972

[21] Appl. No.: 227,108

[52] U.S. Cl.................. 29/40, 29/48.5 A, 90/13 C, 408/3
[51] Int. Cl............................................. B23b 7/04
[58] Field of Search.......................... 408/35, 117, 3; 90/13 C; 29/40, 39, 35.5, 48.5 A, 564, 568, 48.5 R

[56] References Cited
UNITED STATES PATENTS
3,691,899  9/1972  Antonietto...................... 408/35 X
2,866,530  12/1958  Charlat............................ 408/35 X

*Primary Examiner*—Gil Weidenfeld
*Attorney*—Cyril M. Hajewski et al.

[57] ABSTRACT

This invention relates to a spindle changer mechanism adapted to selectively interchange a plurality of spindle heads between a single power receiving operating station and a spaced apart storage station. Each spindle head is provided with a single rotatable, power receiving input driver continuously engaged at one end to drive a plurality of tool spindles journalled in a preset group in the associated spindle head. To accomplish this, each preset spindle head and its associated input driver is radially secured to a common index table for indexable positioning about a central column defining a single operating station. To provide an operating station, a single power driven output driver is horizontally journalled in the column in parallelism above the indexable table carrying the multiple spindle heads respectively presenting the coacting radial input drivers. To transmit power, the output driver in the column is provided with a transverse output key indexably positionable therewith into spaced parallelism with the indexable multiple spindle head table. Upon such positioning, the rotatable output drive key is moved into parallel alignment with the opposite ends of a continuous positioning key encircling the central column. Prior to effecting a spindle head interchange, an input keyway presented by the input driver then in the operating station is indexably positioned in parallel alignment with the spaced apart input keyways of the respective input drivers then engaging the continuous positioning key encircling the column. Coded identifying means are associated with each of the indexable spindle heads for identifying a preselected stored spindle head that is to be interchanged with the spindle head then operatively engaged in the operating station.

21 Claims, 13 Drawing Figures

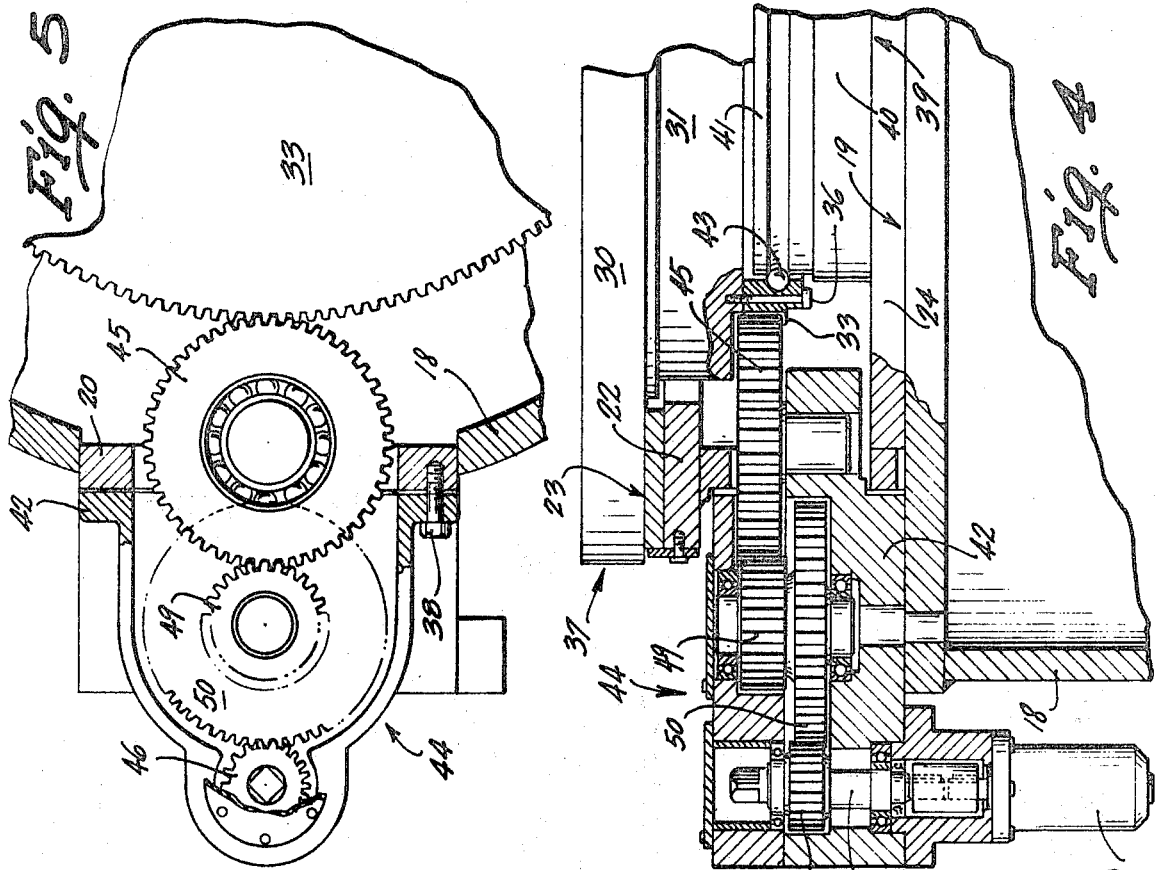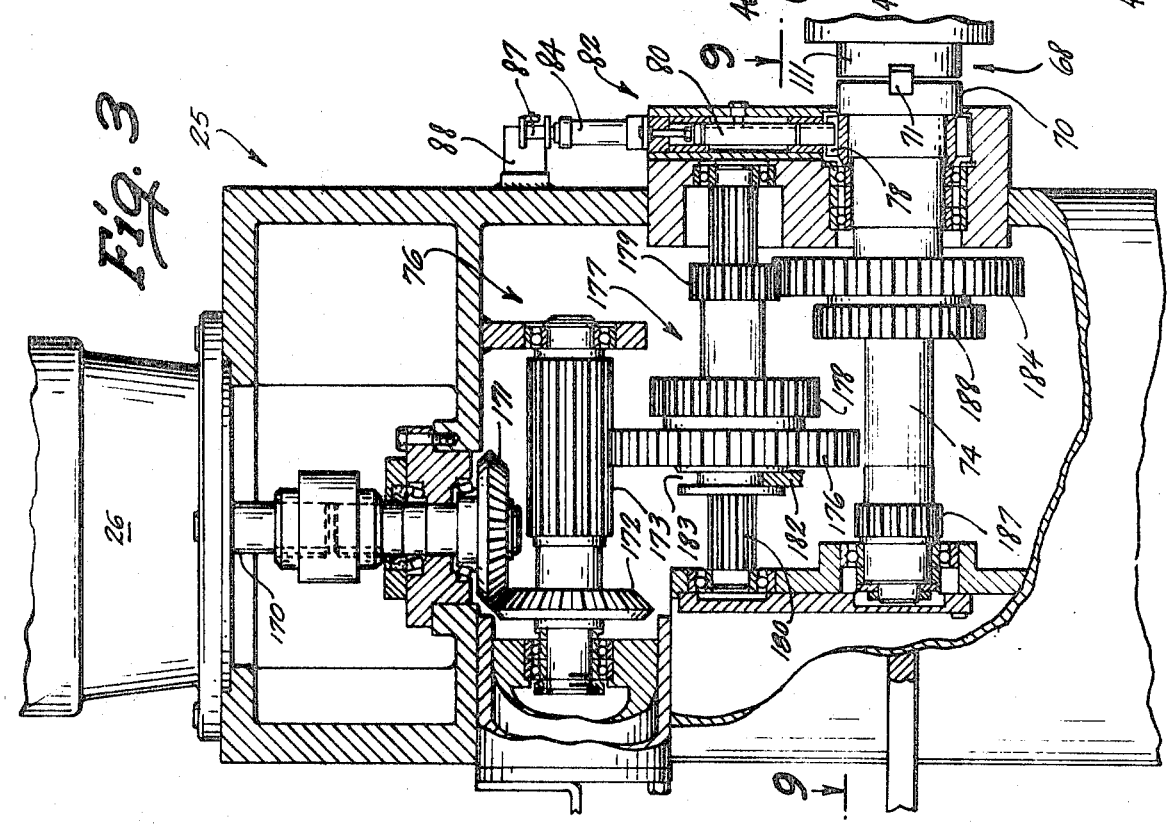

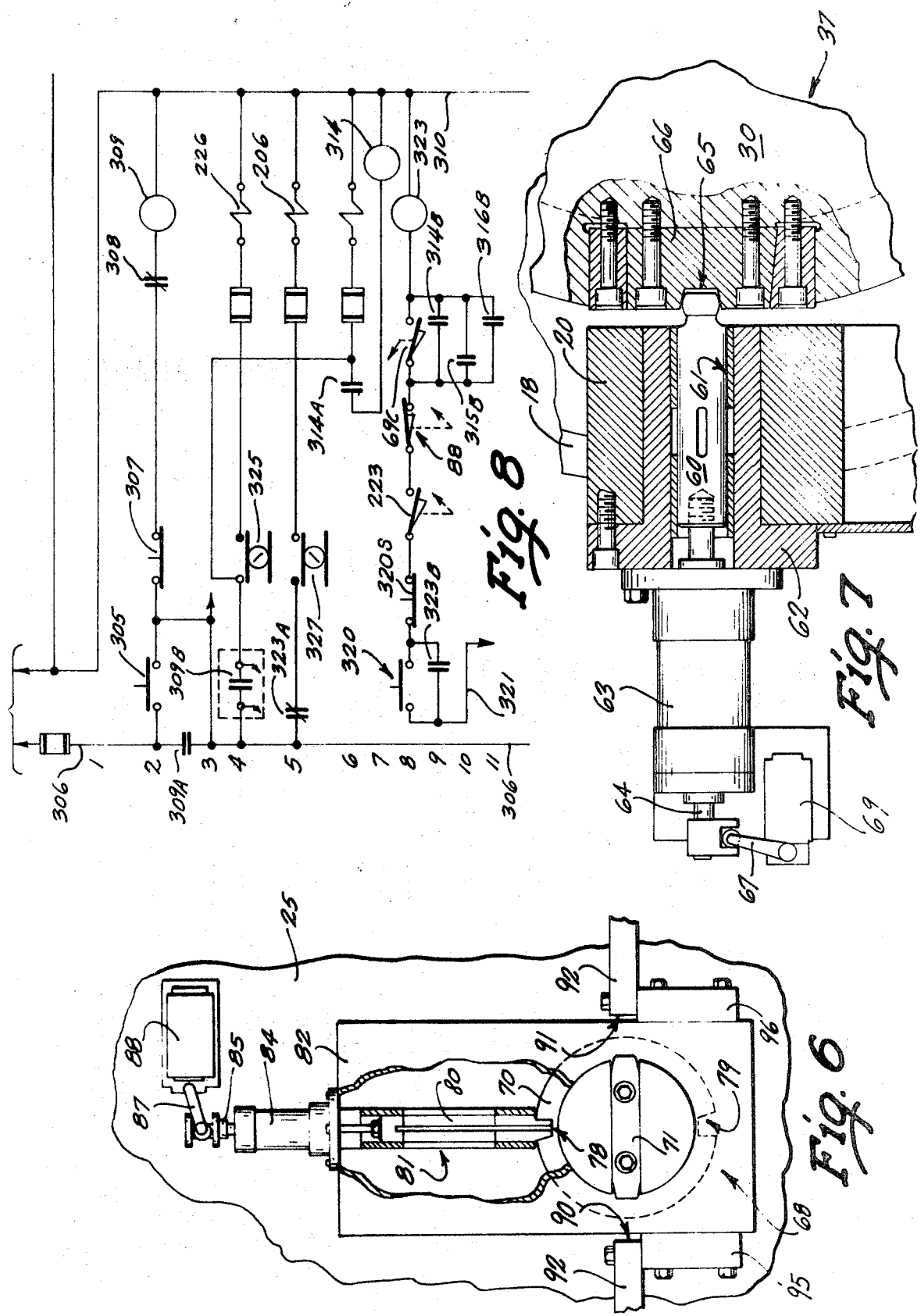

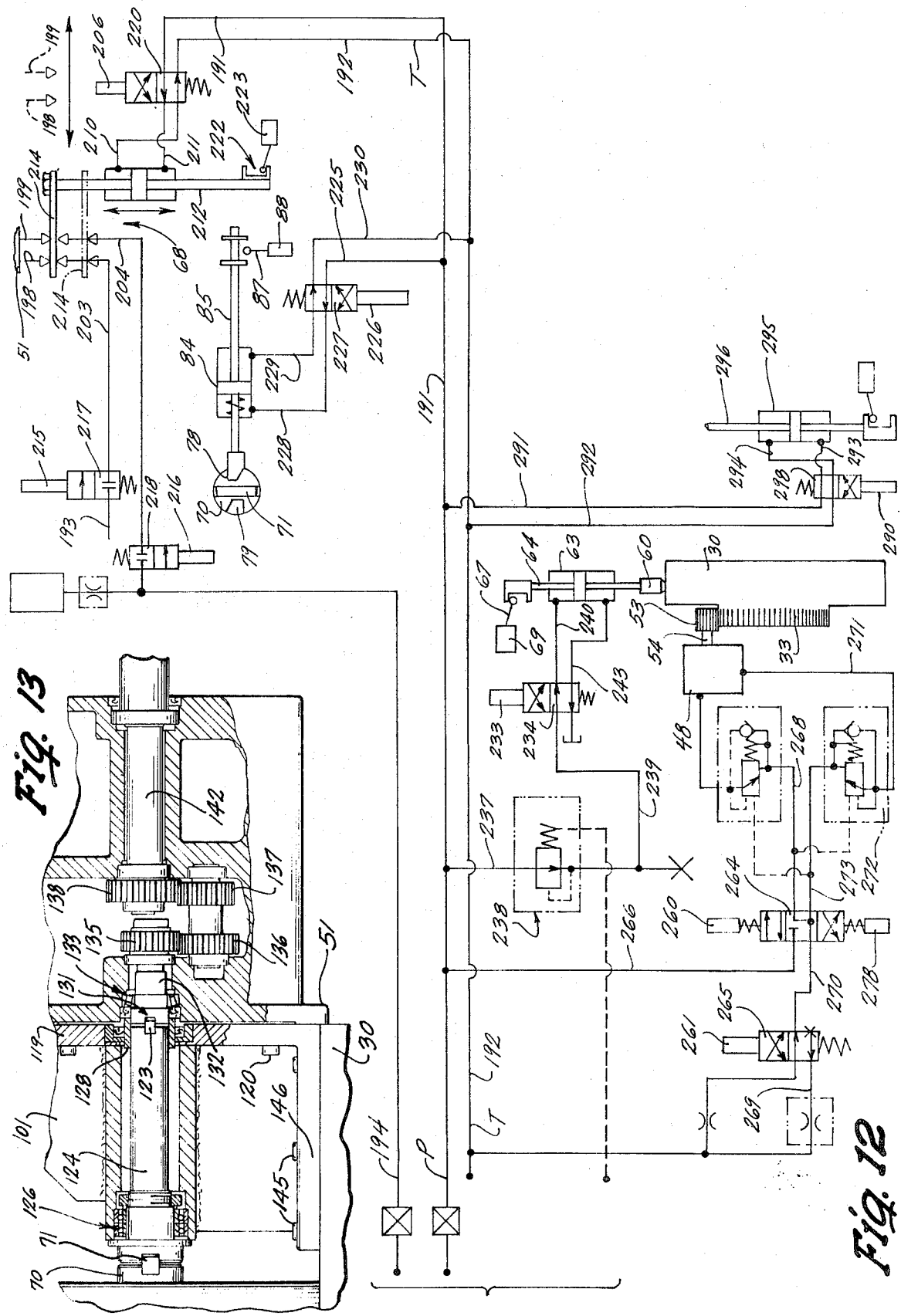

SPINDLE CHANGE MECHANISM FOR A MULTIPLE SPINDLE HEAD MACHINE

BACKGROUND OF THE INVENTION

This invention relates generally to high volume production machines of the transfer type and operative to perform a plurality of different machining operations at a plurality of spaced apart operating stations on corresponding, spaced apart workpieces positionable on an adjacent transfer line. As the successive machining operations are completed, the transfer line is advanced to indexably move the spaced apart workpieces to the next required operating stations. Separate spindle heads driven by separate individual power sources provided at each operating station are coordinately operable to simultaneously perform plural machining operations on the spaced apart workpieces. To provide a selectively lesser degree of high volume production, the present invention is provided with a plurality of spindle heads indexably positionable relative to a single operating station. Each spindle head is driven by one power source at that station for performing a plurality of machining operations in different portions of the same workpiece at that station. Indexably advancing different spindle heads to the single operating station makes possible performing a different predetermined plurality of machining operations on the same workpiece at that station.

BRIEF SUMMARY OF THE INVENTION

According to this invention, new and improved means are provided to shiftably interchange a plurality of preset spindle heads of a multiple spindle head machine. To accomplish this in a preferred embodiment, a central upstanding column is encircled at its central portion by an enlarged circular frame presenting a transverse horizontal guideway. In parallel spaced position above the horizontal guideway, an enlarged ring or continuous positioning key is secured to the upper portion of the column. Space is provided at the front of the positioning ring to receive a transverse drive key affixed to the forward end of a rotatable power driver journalled in the column. A single power source is provided to indexably position the power driver for releasably maintaining the drive key presented thereby in horizontal alignment between the opposite ends of the positioning key affixed to the output driver. At the same time, an index table journalled to rotate on the horizontal tableway likewise encircles the upstanding column and supports in radially spaced relationship a plurality of spaced apart spindle heads. Toward their inward portions, the spindle heads are respectively provided with rotatably journalled power receiving, input drivers each having a separate transverse keyway engaging the stationary ring encircling the column. With the transverse output drive key indexed to horizontal position, power is then applied to selectively advance the index table to return a driver then engaging the output key to stored position and advancing to operating position an input driver than engaging the circular positioning key.

It is a general object of the present invention to provide a greatly improved machine to facilitate effecting a random interchange of complete spindle heads between a single power driving operating station for one spindle head and a storage section for releasably storing a plurality of spindle heads.

Another object of the invention is to provide improved means for selectively engaging a spindle head to be rotatably driven including a transverse drive key on a rotatable output driver and a parallel intermeshing keyway in an input driver.

Another object of the invention is to provide a greatly elongated positioning guide key disposed to simultaneously engage the transversely extending keyways of a plurality of axially spaced apart rotary input shafts in order to retain the keyways in parallel slidable alignment.

A further object is to provide greatly improved drive means including a rotatable shaft presenting a completely transverse drive key together with a power source connecting to selectively rotate the drive key to a predetermined angular position.

A still further object is to provide means for effecting coded identification of a plurality of different multiple spindle heads including power operable means for effecting a bodily interchange between a spindle head in a single operating station and a random identified spindle head in a storage position. A still further object of the invention is to provide an improved selectively indexable power receiving input driver having a plurality of separate power transmitting means each of which is adapted to releasably support different spindle heads having a different plurality of tool spindles disposed in preset patterns.

BRIEF DESCRIPTION OF THE DRAWINGS

The obvious features and advantages of the present invention will become more apparent from the following detailed description of a preferred embodiment shown in the accompanying drawings in which:

FIG. 3 is an enlarged fragmentary view of forward upper portion of the machine, partly in side elevation and partly in vertical section, with parts broken away to the single shiftable power source for the single operating station;

FIG. 4 is an enlarged fragmentary view of the central, rearward portion of the machine taken generally in partial transverse, vertical section and showing the power index drive for the table;

FIG. 5 is an enlarged fragmentary plan view of the position index drive for the index table shown in FIG. 4;

FIG. 6 is an enlarged fragmentary view in front elevation of the operating station illustrating the keylock engaged to align the rotary drive key aligned between the ends of the single, continuous circular positioning key;

FIG. 7 is a fragmentary plan view through the rearward portion of the indexable table positioner;

FIG. 8 is a fragmentary view of a portion of the control circuit for energizing the spindle driver;

FIG. 12 is a hydraulic circuit diagram for effecting selective random interchange of a multiple spindle head in a storage position and a spindle head in a single operating station; and, FIG. 13 is an enlarged fragmentary sectional view of a single power distributor and cooperating multiple spindle head.

DESCRIPTION OF THE PREFERRED EMBODIMENTS

Figure 1:
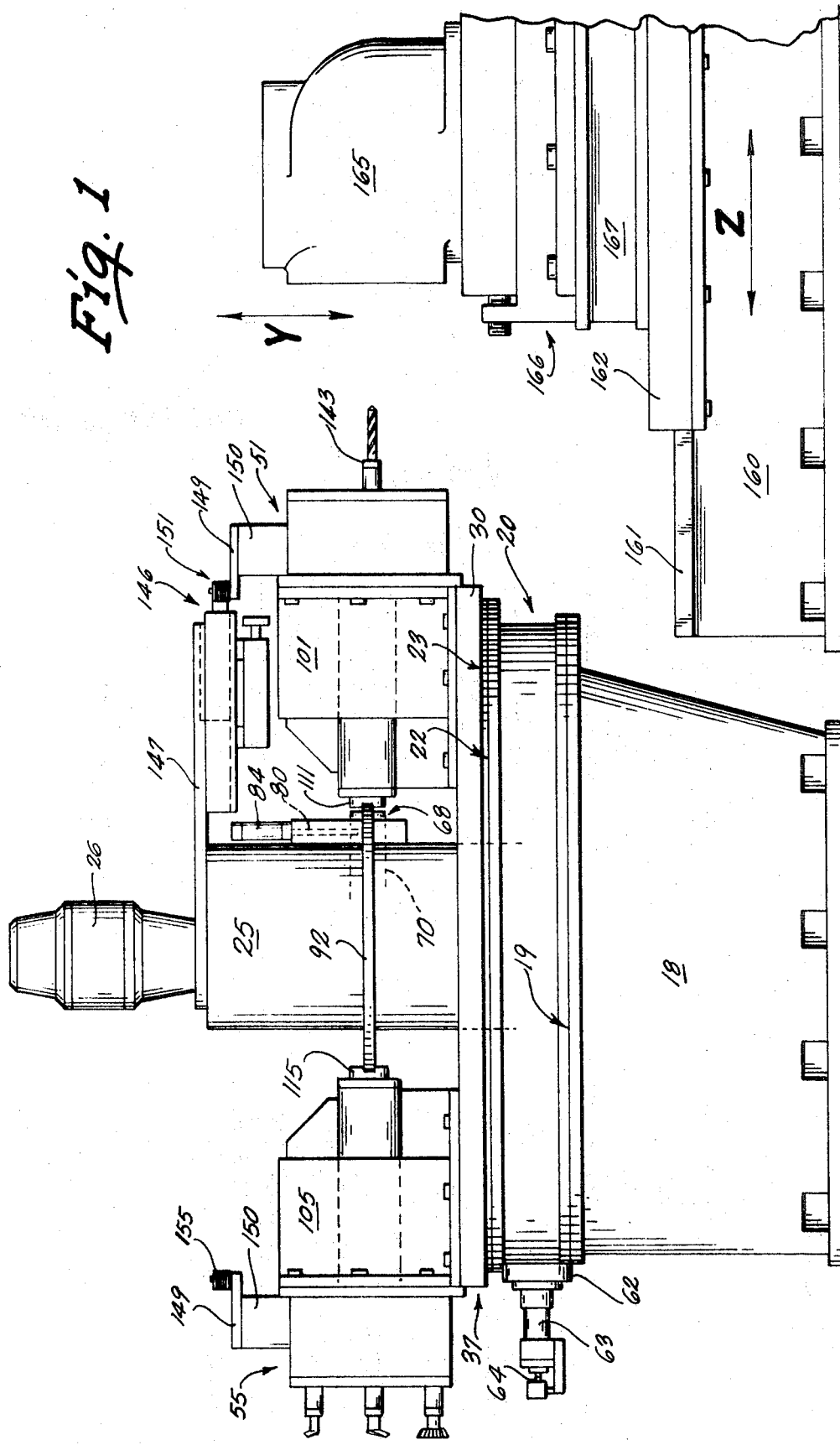
FIG. 1 is a view in side elevation of a machine incorporating the present invention and showing a multiple spindle head changer and cooperating work support.

Referring now to the drawings and specifically to FIG. 1 thereof, a machining center incorporating the features of the present invention is there shown in side elevation. As illustrated, the machine comprises generally an enlarged circular base or frame 18 having fixedly secured to its upper face 19 an enlarged circular transmission housing 20. The shallow vertical depth of the large circular housing 20 is delimited by a lower horizontal wall 24 and an upper wall 22 to which is welded a support bearing presenting an enlarged horizontal way 23. Both the wall 22 and horizontal way 33 encircle a vertically upstanding column 25 secured at its lower end to the frame 18. Although not shown in detail, it will be understood that the base 18 and vertical column portion 25 may be initially formed in two sections that are then fixedly secured together by bolts or weldments to constitute one unitary structure. As shown in FIGS. 1 and 4, the enlarged unitary transmission 20 is formed with the lower horizontal wall 24 affixed directly to the upper face 19 of the frame 18.

Upon the upper fixed horizontal circular bearing way 23 carried by the transmission housing 20, an enlarged index table 30 is guided for slidable rotational movement about the vertical column 25. to effect such rotary movement, the undeside of the enlarged index table 30 is provided with a downwardly depending base 31 of slightly reduced diameter having, in turn, secured thereto a further depending ring gear 33. As shown in FIG. 4, the ring gear 33 is of further reduced diameter and is concentrically secured directly to the underside of the depending table base 31 by a plurality of circularly spaced cap screws such as 36.

It will be apparent that the enlarged index table 30, together with the concentrically depending base 31, and ring gear 33 of reduced stepped diameters comprise an enlarged unitary table structure 37 principally supported by a centrally positioned unitary bearing structure 39. To do this, the structure 39 is provided with a base 40 secured to the lower inner, horizontal wall 24 of the transmission housing 30 in a position to fixedly support an upwardly extending inner race 41 of the bearing structure 39. Around its periphery, the inner race 41 is provided with an annular groove supporting in well-known manner a plurality of bearing balls 43 constrained therein by a cooperating inner groove provided directly in the ring gear 33 in a manner to constitute the outer bearing race.

Figure 2:
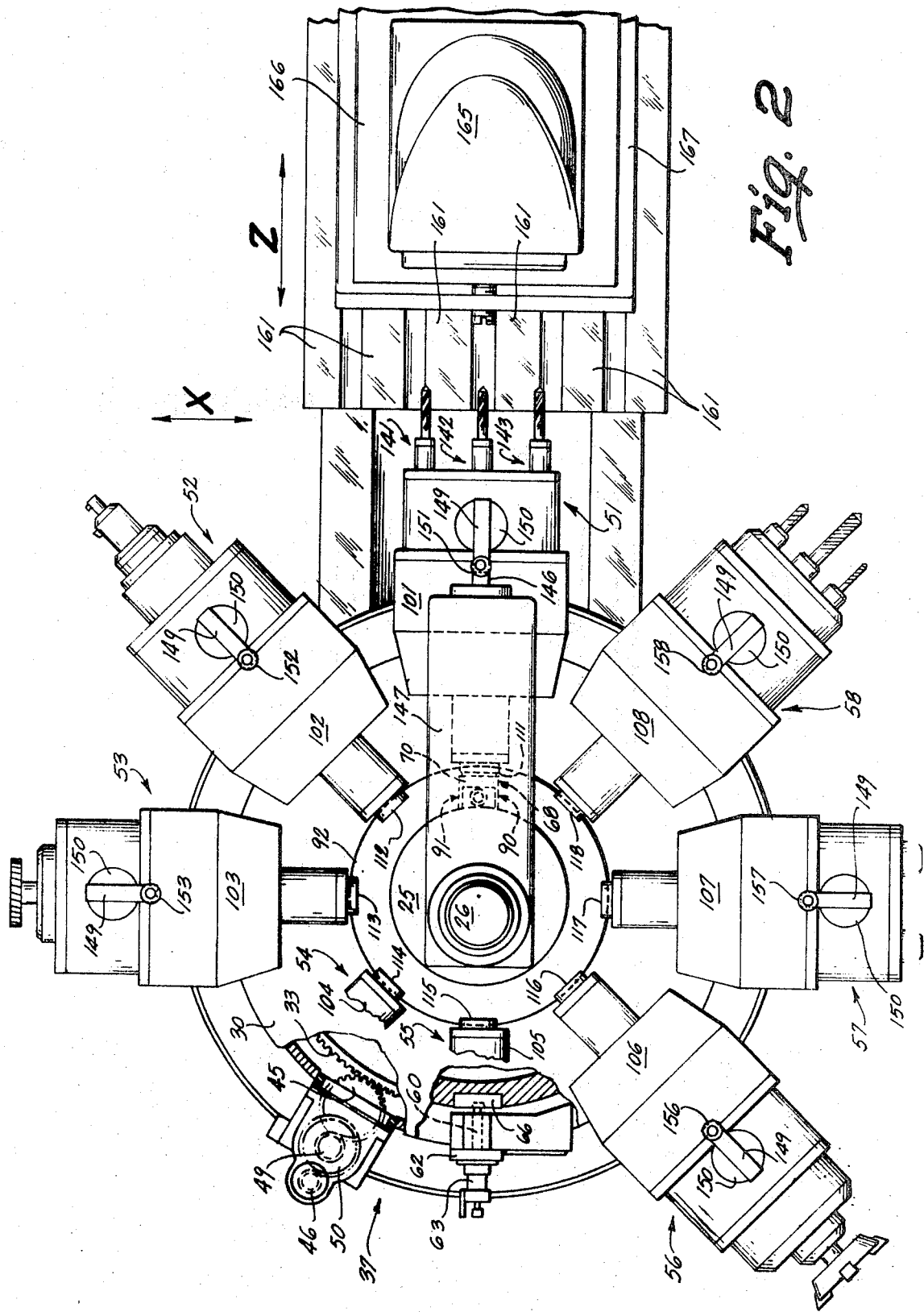
FIG. 2 is a plan view of the entire machine, similar to that shown in FIG. 1, and showing an enlarged index table carrying multiple spindle heads having the inner, rotatable drivers slidably engaging a unitary, single, elongated circular positioning key.

Thus, the central inner race 41 of the unitary bearing structure 39 provides a principal anti-friction support for the cooperatively disposed unitary table structure 37. During operation, as will hereinafter be explained and as shown in FIG. 2, the unitary table structure 37 supports a plurality of peripherally spaced multiple spindle heads 51 to 58 inclusive. Depending upon production requirements, the total diameter of the table 30 and the size of the individual spindle head, the machine may be preset for operation with any number of individually preset spindle heads. To graphically illustrate this in simplified form, the machine shown in FIG. 2 is provided with an index table 30 to which the eight spindle heads are directly bolted with different preset numbers and kinds of cutting tools.

In contrast to FIG. 2, the machine shown in FIG. 1 is provided with only the two spindle heads 51 and 55 which are bolted directly to the index table 30 in 180° spaced apart positions. Although not shown, it will be readily apparent that the table 30 of the present invention can be preset to receive and operate with other preselected numbers of spindle heads, for example for such heads spaced 90° apart. In any event, the resultant total weight including spindle heads, gear transmissions, spindles and size of tools in each head may be somewhat unequally distributed about the index table 37. To this end, the unitary bearing structure 39 is adapted to cooperate with the outwardly spaced hoirzontal and circular bearing way 23 in fully supporting concentrically spaced apart portions of the unitary table structure 37 irrespective of overloads resulting from unequal weight distribution.

To effect selective indexable rotation of the table 37, the ring gear 33 is meshingly engaged by a drive gear 45 supported by a hub rotatably journalled in a portion of an integrally formed wall or housing 42 of transmission 44. A speed reducing couplet having an upper gear 49 engaging the drive gear 45, is provided with a lower input gear 50 directly engaged by the input power supply gear 46. The input gear 46 is mounted on a shaft 47 journalled in the transmission housing 44, and that is normally connected to be selectively driven by an index control motor 48. As hereinbefore explained, the enlarged circular transmission housing 20 is affixed directly to the frame 18. At its leftward end, as shown in FIG. 5, the enlarged housing 20 is provided with an opening for receiving the unitary feed transmission 44 operatively mounted in the unitary frame of housing 42. To secure the transmission 44 in operating position, the housing 42 is formed with an integral bracket secured directly to the leftward end of the housing by cap screws 38.

To position and retain the index table 30 in selected indexed position relative to the operating station, a retractable index plunger 60 is slidably carried in a tubular socket 61 formed in a bracket 62 secured to the end of the enlarged bracket 20. As shown in FIGS. 2 and 7, the index plunger 60 is provided with a tapered inner end engaging a complementary tapered socket 65 formed in a positioning bracket 66 affixed to the index table 30. In the arrangement illustrated in FIG. 2, the positioning bracket 66 is engaged by the index plunger 60 to position and maintain the spindle head 51 in an operating station 68. In other words, the support bracket 62 is fixedly secured to the circular table support 20 and frame 18 in a position spaced 180° from the operating station 68 shown adjacent the output driver 70 journalled in the column 25. The rotatable shaft or output driver 70 has fixedly secured to its forward outer end a transverse drive key 71 that is selectively rotatable therewith for supplying output power to one or another of the spindle heads 51 to 58 inclusive. Although not shown in detail in FIG. 2, it is emphasized that the unitary index table structure 37 is provided with eight (8) peripherally spaced positioning brackets 66. Each of the other seven positioning brackets 66 (not shown) is so secured to the periphery of the table structure 37 as to present a tapered socket such as 65 spaced 180° from the other spindle heads 52 to 58 inclusive. Upon movement of any preselected spindle head into the operating station 68, therefore, a tapered index control socket spaced 180° therefrom around the table 37 is moved into position to be engaged by the index plunger 60.

As shown in FIGS. 3 and 6, the output drive shaft 74 is directly connected to rotate the output driver 70 at a selected rate as well as rotate the drive key 71 secured thereto, into a predetermined angular position. As a prerequisite to effecting selective shifting or indexing movement of the spindle heads 51 and 58 relative to the single operating station 68, it is necessary to effect predetermined angular positioning of the rotatable driver 70 and drive key 71. To rotate the drive key 71, spindle head drive motor 26 is connected to supply output power via a shiftably geared variable speed transmission 76 to rotate the shaft 74. For retaining the drive key 71 in the required transverse angular position, the output driver 70 is provided with two index notches 78 and 79, spaced 180° apart in position to be respectively engaged by a vertically movable index control plunger or keylock 80. A cooperating vertical cylinder 81 fixedly mounted within a rectangular support 82 carried by the vertical column 25 guides the index plunger 80 for moving the tapered lower end relative to one of the notches 78 or 79. Index plunger 80 is connected to be moved vertically by hydraulic cylinder 84 mounted upwardly of the rectangular support 82. A vertically movable actuating shaft 85 extending upwardly above cylinder 84 is provided at its upper end with a collar that engages the outer end of a pivotal switch lever 87 of a switch 88 to indicate the vertical position of index plunger 80 and condition an associated control circuit, FIG. 11. As soon as the power driver 70 is rotated to the position illustrated in FIGS. 3 and 6, downward pressure being applied by cylinder 84 urges the lower end of plunger 80 to engage notch 78 and causing corresponding downward movement of shaft 85 to pivot switch lever 87 downwardly, as shown. With actuator 70 in the position shown, the transverse drive key 71 secured thereto is likewise forcibly maintained in parallel alignment between the opposite ends 90 and 91 of a continuous positioning ring or key 92 completely encircling the upper central portion of the vertical column 25, as shown in FIGS. 2 and 6.

The opposite inner ends 90 and 91 of the continuous positioning ring 92 are fixedly secured to associated brackets 95 and 96 by cap screws and with the brackets, in turn, being fixedly supported by the rectangular support 82 to constitute a rigid part of the column structure 25. In a similar manner, the continuous circular positioning key or ring 92 is fixedly secured to the vertical column 25 in at least two other points (not shown) spaced between its opposite ends 90 and 91. In other words, the circularly elongated positioning key 92 provides a rigid circular track, parallel to the index table 30 and transverse to the column 25, and is positioned to continuously engage keyways of the rotary input drivers for each of the seven spindle heads 52 to 58 inclusive.

As shown in FIG. 2, each of the eight spindle heads 51 to 58 inclusive is releasably and fixedly bolted to eight corresponding power distributors 101 and 108 inclusive. Each of the power distributors 101 and 108 comprises a tapered or wedge shaped head structure that is fixedly bolted in known manner to the enlarged rotary table 30 by means not shown for selective, indexable positioning movement therewith relative to the single power driving operating station 68. To receive and selectively distribute power, eight separate power receiving input shafts 111 and 118 inclusive are respectively journalled in the corresponding power distributors 101 and 108 inclusive. With the machine conditioned as shown in FIG. 2, the seven power distributors 102 to 108 inclusive are in stored position in which transverse keyways at the inner ends of the respectively journalled shafts 112 and 118 inclusive simultaneously engage the continuous positioning track or elongated circular key 92. Inasmuch as the power distributor 101 is in the single operating station during the condition illustrated, the keyway in that associated power input shaft 111 is angularly positioned to be operatively engaged by the transverse drive key 71 fixedly pinned to the front face of the rotatable output driver 70.

Angular alignment of the horizontal axis of the output drive 111 relative to the vertical axis about which index table 30 rotates is maintained by power insertion of the table index plunger or shot pin 60 with the cooperating notch 65 is positioning bracket 66 as hereinbefore explained. It is necessary that this alignment about the vertical table axis be maintained before output power is transmitted from the spindle drive motor 26, via variable speed transmission 76, output driver 70, and drive key 71 to rotate input driver 111 for supplying power to the distributor 101, and thence to the multiple spindles in the head 51.

Conversely, before retracting the table index plunger 60 to permit indexable movement of the table 30, it is essential that output driver index plunger 80 be urged downwardly into engagement with the index notch 78 as shown in FIG. 6. For this reason, interlocking electrical circuitry is connected to preclude simultaneous retracting movement of both the table index plunger 60 and the output driver index plunger 80 to outward disengaged position. Instead, both index plungers 60 and 80 must be simultaneously urged inwardly into full engagement with the respectively associated positioning notches, such as table notch 65 and output driver notch 78 as described.

Operation of the table cylinder 63 to urge table plunger 60 inwardly, as shown in FIG. 7, effects corresponding inward movement of actuator shaft 64, thereby pivoting switch lever 67 of control switch 69 inwardly. At this time, as previously explained, cylinder 84 is likewise actuated to maintain plunger 80 in inwardly engaged position, as shown in FIG. 6, thereby moving the associated shaft 85 downwardly to pivot switch lever 87 downwardly and actuate switch 88 to indicate that the drive key 71 is horizontally aligned between the ends of the positioning key 92.

After these two indexed conditions have been established as a prerequisite to effecting a selected interchange of spindle heads in the single operating station 68, vertical control plunger 80 remains engaged and horizontal control plunger 60 is axially retracted or disengaged. This insures retention of pivotal lever 87 of vertical control switch 88 in its inward engaged position while the pivotal lever 67 of horizontal control switch 69 is moved outwardly to indicate axial retraction of the associated index plunger 60. Since the output driver 70 is retained in indexed position to maintain drive key 71 in parallelism between the ends of the fixed positioning key 92, table drive motor 56 may now be selectively energized to indexably move the table 30 together with the spindle heads 51 to 58 inclusive relative to the operating station 68. With the rotary drive key 71 being maintained in its transverse, parallel position, it becomes a part of the fixed positioning track 92 to cooperate therewith and permit slidable transverse movement of the separate keyways respectively provided in the power receiving input shafts 111 and 118 respectively. Power driven indexable movement of the index table 30 together with the integrally secured power distributors 101 to 108 inclusive, and spindle heads 51 to 58 inclusive thus continues until the next preselected multiple spindle head is rotatably advanced into the operating station 68.

During this rotary indexable movement of the table 30 and associated head structures, the keyways in the respective input shafts 111 and 118 journalled in the respective rotary distributors 101 to 108 inclusive are in closely fitted transverse slidable engagement both along the continuous circular positioning key 92 and along the parallel interconnecting releasable drive key 71. With these conditions established likewise, the spaced apart rotary input shafts 111 and 118 in the respective power distributors 101 to 108 inclusive are also retained in identical angular relationship, as are the transverse drive keys respectively provided at the outer ends of those shafts.

As shown in FIG. 13, each single individual spindle head such as 51 is releasably secured to the other faceplate 119 of a selected power distributor such as 101 by means of a plurality of peripherally spaced cap screws, such as 120. To provide driving power from the power distributor 101, a drive key 123 is transversely secured within the outer end of a power transmitting shaft 124 rotatably journalled in the distributor 101 in parallelism with the drive key 71 transversely secured within the outer end of the single output driver 70.

The single output driver 70, including drive key 71, is horizontally journalled in the forward face of the vertical column 25 to transmit selected variable speed power from the motor 26 to drive the distributor shaft 124 as explained. It should be noted that the rotatable distributor shaft 124 is rotatably journalled at its inner end in a pair of anti-friction bearings 126 having their outer races secured within a suitably bored opening formed toward the inner, vertical face of the housing for the power distributor 101. In view of the novel transversely slidable engagement of the driven keyways of receiving shaft 111 with output driver key 71, as well as the extreme range of both power and speeds transmitted therebetween, it is essential that axially aligned anti-friction means operatively support the interconnecting shafts.

To this end, the outer end of distributor shaft 124 is journalled in a sleeve bearing 128 carried toward the outer, vertical face of the associated housing for the distributor 101. Upon attachment of the selected spindle head 51 to the front vertical face of power distributor 101, a keyway 131 transversely shown in spindle head pilot shaft 132 is operatively engaged with the drive key 123 in the outer end of the concentrically aligned rotatable distributor shaft 124. As the spindle head 51 is bolted into full engagement with the vertical face of distributor 101, and anti-friction bearing 133 supporting the power receiving pilot shaft 132 is forcibly urged into axial concentric alignment with the anti-friction bearings 126 supporting the inner end of distributor shaft 124. Inasmuch as the outer sleeve bearing 128 is deliberately preset to permit a light radial float of shaft 124, the outer end thereof is likewise then urged into continuously maintained proper axial alignment by pilot shaft anti-friction bearing 133 as drive key 123 engages the driven keyway 131 of shaft 132.

From the single rotatable power receiving pilot shaft 132 within the spindle head 51, power is transmitted via interconnected transmission gears 135, 136, 137 and 138 to drive a tool receiving spindle 142. Although only one tool spindle 142 is shown in the enlarged fragmentary view, FIG. 13, it is emphasized that the transmission gears 135 and 138 inclusive are connected to drive the additional tool spindles 141 and 143, FIG. 2, by means of additional driven gears (not shown). Thus, the single output pilot shaft 132 rotatably journalled in the spindle head 51 is simultaneously connected to supply output power to the three tool spindles 141, 142 and 143 upon full transverse engagement of distributor 101 with the output driver 70 of drive key 71.

It is emphasized also that the spindle head 51 is fixedly, but releasably, bolted to the distributor 101 by the peripherally spaced cap screws 120 as explained. Furthermore, the power distributor 101 is in a similar fixedly, but releasably, secured radially spaced relationship to the face of the selectively indexable table 30 by a plurality of cap screws 145 extending through one transverse flange 146. In a similar manner, the distributor 101 is provided on its far side with another transverse flange (not shown) that is likewise releasably secured to the table 30 by a plurality of cap screws similar to 145. In this manner, therefore, one preselected spindle head 51 is rigidly bolted to one preselected power distributor 101, with the latter being rigidly bolted to the indexable table 30. It will be readily apparent that spindle head 51 and power supply head 101 are fixedly secured to rotary table 30 to provide one radial segment selectively indexable relative to the single operating station 68 and the selectively available, variable speed power supply.

The other seven spindle heads 52 and 58 inclusive are releasably bolted to the respective power distributors 102 to 108 inclusive, as shown in FIG. 2. Likewise, as already explained, the power distributors 102 to 108 are fixedly bolted to the indexable table 30 to cooperate therewith in comprising one complete indexably positionable structure. For illustrative purposes, spindle heads 52 to 58 inclusive are provided with different numbers of rotatable spindles as well as different numbers and types of rotatable machining tools. For example, one boring bar is in spindle head 52, face mills of different diameter are respectively in spindle heads 53 and 56, two boring bars are in head 57, and like numbers of drills (3) are carried by heads 58 and 51

It is emphasized that this invention is not restricted to either the number of tool spindles or the types of tools illustrated in each of the spindle heads shown in FIG. 2. Actually, any of the eight power distributors 101 to 108 inclusive may be connected to drive a spindle head (not shown) having 24 separately rotatable tool spindles driven by a single input pilot shaft, such as 132 in FIG. 13. In other words, it is considered within the purview of this invention to provide a total number of different preset spindle heads, such as 51 to 58 inclusive, respectively having the number of spindles (1 to 28) required for the machining programs then being performed.

One of the important advantages of the present invention is its extremely board flexibility of use. In effect this invention provides a completely new and simplified arrangement for selectively interchanging a power distributor between one of seven storage positions engaging the fixed circular, positioning key 92 and a single operating station 68 engaging a rotatable drive key 71. Interchange of one power distributor from storage to the single power receiving operating station 68 likewise can be accomplished in several different ways. One preferred method of controlling a spindle head interchange is to provide random spindle head identification. To achieve this result, as shown in FIG. 1, a code actuated switch reader 146 is carried at the outer end of a horizontal arm 147 fixedly secured at its inner end to the column 25 and extending forward at the single operating station 68. The switch reader 146 is provided with a plurality of vertically spaced switches (5) disposed to be actuated in binary coded fashion by vertically stepped, binary coded actuating means 151 secured to an integrally formed support 149 affixed to spindle head 51 for selective indexable movement therewith.

In addition to random coded identification of the spindle heads, although not illustrated in the drawings however, the power distributors can be indexably placed in the successive locations about the table 30 in the fixed sequential order of their intended use. In such an arrangement, positional identification is then achieved by securing one longer stop dog (not shown) directly to the first power distrubutor 101 of the series, and also securing an individual one of a plurality of indivual stop dogs (not shown) respectively to the other seven power distributors including 102 to 108 inclusive. In such an arrangement, the index table 30 and distributors 101 to 108 fixedly secured thereto may be programmed for selective clockwise rotation relative to the single operating station 68. The successively located power distributors 101 to 108 inclusive are indexably movable relative to the single operating station operatively connected thereto (68) in a predetermined fixed sequence of intended use. Such a fixed sequence cycle includes presetting the position dogs (not shown) as described, and starting the motor 48, FIG. 4, to rotate the ring gear 33 for moving the index table 30 and associated distributors in a clockwise direction. Upon arrival of the first distributor 101 in the operating station 68, the described longer stop dog (not shown) associated with that distributor moves into engagement with a cooperating stop switch (not shown) to control motor 48 for interconnecting power distributor 101 in operating station 68.

After using the distributor 101 to transmit power therethrough to perform the necessary operations, motor 48 is restarted to again index the table in a clockwise direction. As this 45° segment of index table movement then occurs, a shorter stop dog (not shown) associated with the next power distributor 102 in the fixed sequence moves into position to actuate a differently spaced stop switch (not shown). The second of the seven shorter stop dogs in the series then functions to deenergize the motor 48 to stop table movement with the second power distributor then being sequentially and operatively interconnected in the single operating station 68. In a similar manner, the motor 48 is sequentially reenergized to restart index table movement for successively moving the remaining operating station 68.

In a fixed sequence arrangement of the type described, it will be apparent that seven shorter stop dogs (not shown) are respectively associated with the spindle heads 52 to 58 inclusive, to cooperate with one stop switch (not shown) to effect stopping of the table in fixed sequence segments of 45°. Starting of the next or second cycle is clearly indicated by arrival of the first power distributor 101 into a position adjacent the operating station 68 in which the longer stop switch (not shown) identifies the first distributor.

The aforedescribed fixed sequence cycle of operation further emphasizes the flexibility of use of the present invention Instead of only direct random coded identity of the spindle heads, therefore, the present invention provides an alternative fixed sequence control means of the type described between the column 25 and successive distributors 101 to 108 can be applied in like manner directly between the column 25 and the spindle heads 51 to 58 inclusive.

Referring again to FIGS. 1 and 2, the preferred random identifying arrangement is there illustrated for moving the spindle heads 51 to 58 into the single operating station 68 in any predetermined sequence. In doing this, a principal object is to effect a binary coded identification of each individual spindle head. With each spindle head of an entire set of eight spindle heads having a coded identity, it will be apparent that such coded identity can be incorporated in a numerically controlled machine program. To achieve this identity, each of the spindle heads 51 to 58 inclusive is provided with upstanding support structures 150 and 149 with the latter supporting a separate, forwardly extending coded switch actuator. To identify and stop a spindle head upon its arrival in the single operating station 68, the unitary structures 150 and 149 respectively upstanding from head 51 to 58 inclusive, respectively support the binary coded switch actuators 151 to 158 inclusive. Each of the coded switch actuators is provided with five vertically spaced rings disposed in stepped fashion to effect binary coded actuation of five vertically spaced switches comprising the coded switch reader 146.

The five rings comprising one binary coded actuator 151 are each a selected diameter of two stepped diameters about a common center. Each coded actuator, such as 151, provides a coded summation in actuating the five correspondingly, vertically spaced switches in the coded reader 146. It is not deemed necessary to further explain this particular aspect of the present invention since utilizing five binary coded rings (151) in actuating five vertically spaced switches (reader 146) is more fully explained in U.S. Pat. No. 3,052,999, which issued Sept. 11, 1962. In the aforementioned patent, coded identity is used to identify a selected individual tool that is automatically transferred from a storage location to an operating station or individual tool spindle. In the present invention, on the other hand, coded identification is used to identify complete sets of tools or spindle heads. For example, random selection of the eight preset spindle heads 51 and 58 can then be effected in the particular sequence required by a machine program. Likewise, the binary coding obviates the requirement for moving the eight heads to the operating station 68 according to a predetermined fixed positional sequence as earlier described. Instead, the program can effect identification and advancement of the enumerated spindle heads to the single operating station 68 in the following sequence: first (51), second (58), third (54), fourth (56), fifth (52), sixth (53) seventh (57), and eighth (55).

To simplify the disclosure of the present invention, associated work supporting structure is illustrated in FIGS. 1 and 2 as providing one principal horizontal axis of movement relative to a preselected spindle head in the single operating station. As shown, an associated supporting base 160 is provided with transversely extending guide ways 161 adapted to slidably support a work table 162 for transverse movement relative to the single operating station 68. A workpiece 165 is releasably secured to the work table 162 by means of intermediate attachment means 166 and a rotary index table 167.

Although not shown in the drawings, cross feed power drive means including a screw and nut are operatively interconnected in well-known manner to effect movement of the work table 162 toward or away from the operating station 68 in either direction along a Z axis. Likewise, indexable power control drive means (not shown) are operatively interconnected to effect selective indexable movement of the index table 167 relative to the table 162. It will be apparent that index table 167 may be selectively indexed in 90° segments to successively present each of the four faces of a workpiece, such as 165, to one preset group of tools carried by a preselected spindle head 51 positioned in the operating station 68.

To afford even further flexibility in operation, additional rectilinear table supporting means (not shown) can be operatively interposed between the underside of the power driven cross slide table 162 and the base 160 to obtain longitudinal X axis movement. Inasmuch as this structure and mode of operation in obtaining rectilinear movement along mutually perpendicular X and Z axes is conventional, it is not deemed necessary to illustrate additional movements. It is submitted the described structure does clearly illustrate power driven feeding means connected to effect relative rectilinear feeding movement between a selectively positioned, multiple spindle tool carrying spindle head and a work support to perform a selected multiple spindle machining operation.

To supply power to rotatably driving any of the spindle heads at a preselected one of nine different output speeds, there is provided a three speed spindle drive motor 26 connected to supply power to drive the three speed shiftably geared transmission 76. From motor 26, as shown in FIG. 3, power at a selected one of three speeds is transmitted via an output shaft 170, and interconnecting bevel gears 171 and 172 to rotate a horizontally journalled splined shaft 173 in the transmission 76. Depending on the selected speed of output driver 70, a large diameter spur gear 176 of a shiftable gear cluster 177 is engaged by the splined shaft 173 in one of three different axially shifted positions. Input gear 176 also functions as a high speed drive gear of the axially shiftable cluster 177 which is also provided with an integrally formed intermediate speed drive gear 178, and a low speed drive gear 179. As illustrated in FIG. 3, an axially shiftable fork 182 engages cam groove 183 to maintain gear cluster 177 in a position in which low speed gear 179 engages a large diameter driven gear 184 carried by the horizontally journalled splined shaft 74. As previously explained and as shown in FIG. 3, drive shaft 74 is journalled in spaced apart bearings in the column 25 and connected to drive the output driver 70 and rotatable drive key 71.

In like manner, axial forward shiftable movement of the cluster 177 along its supporting shaft 180 disengages gear 179 and effects engagement of intermediate gear 178 with driven gear 188. Similarly, axial shiftable movement of the cluster 177 in the opposite direction disengages both low speed drive gears and directly engages the high speed gear 176 with cooperating spur gear 187 that is splined directly to the drive shaft 74.

The hydraulic circuit to control the interlocking index plungers, indexable movement of the ring gear, operative connection of a selected spindle head, ans shiftable movement of the speed transmission 76 is shown in FIG. 12. In addition to the foregoing, several additional control functions are performed by the circuit which, as schematically shown, is provided with a principal hydraulic pressure supply line 191 and return or exhaust line 192. To facilitate reading the circuit, the hydraulic supply line 191 is identified by the letter P (pressure) and the return or exhaust line 192 by the letter T (tank). In addition to hydraulic pressure fluid and exhaust for effecting the control functions described, there are provided sources of air pressure and coolant under pressure for selective connection to whichever one of the spindle heads is positioned in the operating station 68. As schematically shown, separate supply lines for coolant under pressure (COOLANT) and air under pressure (AIR) are indicated in FIG. 12 as 193 and 194 respectively.

During machine operation, it will be recalled that only one of the eight spindle heads is moved from storage adjacent fixed circular positioning rings into the single operating station 68. In addition to sliding transversely from engagement with the stationary positioning ring 92 into driven engagement with the transverse drive key 71, as described, the spindle head 51 is provided with supply lines 198 and 199 that are concomitantly connected to receive collant and air from machine supplying lines 193 and 194.

Prior to full arrival of spindle 51 in transverse operating station 68, a disconnect service 201 has been electrically actuated to maintain flexible attachment lines 203 and 204 in longitudinally rearward or disengaged position. Doing this requires energization of a solenoid 206 to move the associated valve spool outwardly and connecting lines P and T through the then restracted valve spool to lines 210 and 211. Pressure fluid to line 210 from supply line 191 (P) urges the control piston longitudinally rearward to effect rearward retracting movement of shaft 212 and lateral support arm 214 to its dotted lines position. Longitudinal retracting movement of support arm 214 is connected to effect like rearward disengaging movement of graphically illustrated valving at the inner ends of pressure supply lines 203 and 204 to retracted dotted line positions. With this condition existing, i.e. solenoid 206 energized, solenoids 215 and 216 are both deenergized to maintain the associated valve spools 217 and 218 in resiliently biased closed position. Closure of valve spools 217 and 218 disconnects pressure supply lines 193 and 194 for coolant and air respectively from output supply lines 203 and 204 respectively whenever the disconnect valving for the latter are in longitudinal retracted position, as indicated by the dotted lines.

The longitudinal arrow in FIG. 12 indicates a path of movement parallel to the axis of the main output drive shaft 74 shown in FIG. 3 and transverse to the rotatable drive key 71. Likewise, the disconnect valving at the outer ends of coolant supply line 203 and air pressure supply line 204 are moved along paths parallel to the longitudinal directional arrow under the forcible control of shaft 212 and transversely extending support arm 214. In further explanation, the supply lines 198 and 199 carried for movement with the spindle head 51 are originally in the rightwardly displaced positions indicated by the dotted lines, and the lateral valving support arm 214 is also in longitudinally retracted position as indicated by the dotted lines. After the spindle head 51 has been moved transversely to the longitudinally aligned operating position as shown, the supply lines 198 and 199 have been moved therewith from the dotted line position to lateral positions of longitudinal alignment with the still retracted lateral arm 214 and valving for disconnected lines 203 and 204.

Upon arrival of the spindle head 51 in the position shown, valve solenoid 206 is deenergized to permit immediate resiliently biased movement of the associated valve spool 220 to the position now shown in FIG. 12. Pressure supply line 191 is then immediately reconnected via the resiliently biased valve spool 220 to the supply line 211. Pressure fluid in the line 211 urges the piston, shaft 212 and lateral arm 214 from the dotted line position and into engagement with the now laterally aligned inlet lines 198 and 199 of spindle head 51. With valve spool 220 resiliently biased inwardly, line 210 remains connected to exhaust line 192 (T) as shown. With these conditions established, continued pressure fluid in supply line 211 urges lateral arm 214 inwardly to maintain valving at the inner ends of lines 203 and 204 in continuous forcible engagement with aligned lines 198 and 199 carried by spindle head 51. Pressure actuated inward movement of shaft 212 moves a switch actuator 222 inwardly to pivot a lever for actuating switch 223 indicating that the service lines 203 and 204 are now connected to energize solenoids 215 and 216 to move valve spools 217 and 218 to open position and immediately connect the main pressure supply lines 193 and 194 to 203 and 204 respectively.

Although not shown in detail, each of the other seven spindle heads 52 and 58 inclusive is provided with separate supply service lines such as 198 and 199. As explained, input supply lines 203 and 204 are disconnected from head lines 198 and 199 by energizing solenoid 206 to move lateral arm 214 to retracted position prior to returning spindle head 51 to storage position. As before, with lateral arm 214 retracted, a preselected one of the other spindle heads is then movable into operating station 68 along with a similarly disposed coolant and air supply lines (not shown). Upon arrival of a different spindle head in the operating station 68, the cycling arrangement for connecting supply lines to pressure supplies 193 and 194 is identical to that described for head 51. In addition to supply lines 198 and 199 for coolant and air respectively, each spindle head is provided with an electrical service plug (not shown) connected to transmit an electrical supply to one of the associated heads 51 to 58 inclusive. Likewise, a cooperating disconnect electrical service supply plug (not shown) is fixedly secured to the later service support arm 214 in a manner similar to the disconnect valving carried thereby for main coolant and air supply lines 203 and 204 respectively. Movement of the lateral service support arm 214 from rearward dotted line to forward position is thus normally operable to effect a simultaneous connection of an electrical service at the same time coolant and air service are connected.

Normally, solenoid 226 is deenergized and valve spool 27 is resiliently biased rightwardly to the position shown in FIG. 12. Pressure fluid then flows from main supply line 191 via a line in the now spring biased valve spool 227 to a branch line 228 connected to cylinder 84 for effecting movement of index plunger 80 upward to fully retracted position. Branch line 229 from the upper end of the cylinder 84 is then connected via the valve spool line to a branch line 230 directly connected to main exhaust line 192. For urging index plunger 80 axially inward, solenoid 226 is energized to actuate valve spool 227 opposite the spring, thereby connecting brach pressure supply line 225 directly to upper cylinder line 229. Since this pressure is applied as the driver 70 is still rotating slowly, plunger 80 is forcibly urged downward to engage index notch 78 and properly position drive key 71 between the ends of the fixed positioning key or track 92.

Cycling operation of a solenoid 233 to selectively position a valve spool 234 for axially positioning a table index plunger or shot pin 60 is effected in a similar manner. With solenoid 233 deenergized to effect spring biased movement of valve spool 234, however, pressure fluid from pressure supply line 191 flows via branch line 237 and valve 238, to branch line 239. The flow of pressure fluid continues from line 239 through a line in the resiliently biased valve spool 234, as shown, to a supply line 240 connected to hydraulic cylinder 63. Whenever pressure fluid is applied to branch supply line 240, index plunger 60 is forcibly urged into engagement with a selected positioning notch 65 in table 30. During this condition, fluid is exhausted from the opposite end of cylinder 63 which is connected via another branch line 243 and a line in the resiliently biased valve spool 234 to tank, as shown.

Prior to effecting indexable movement of index table 30 to position a spindle head 51 to 58 carried thereby, index plunger 60 is hydraulically retracted. Doing this is effected by energizing solenoid 233 to move the valve spool 234 in opposition to the biasing spring and connecting pressure supply line 239 via a line in the pressure actuated valve spool 234 to a branch line connected to fully retract index plunger 60 from engagement with index table notch 65.

Figure 11:
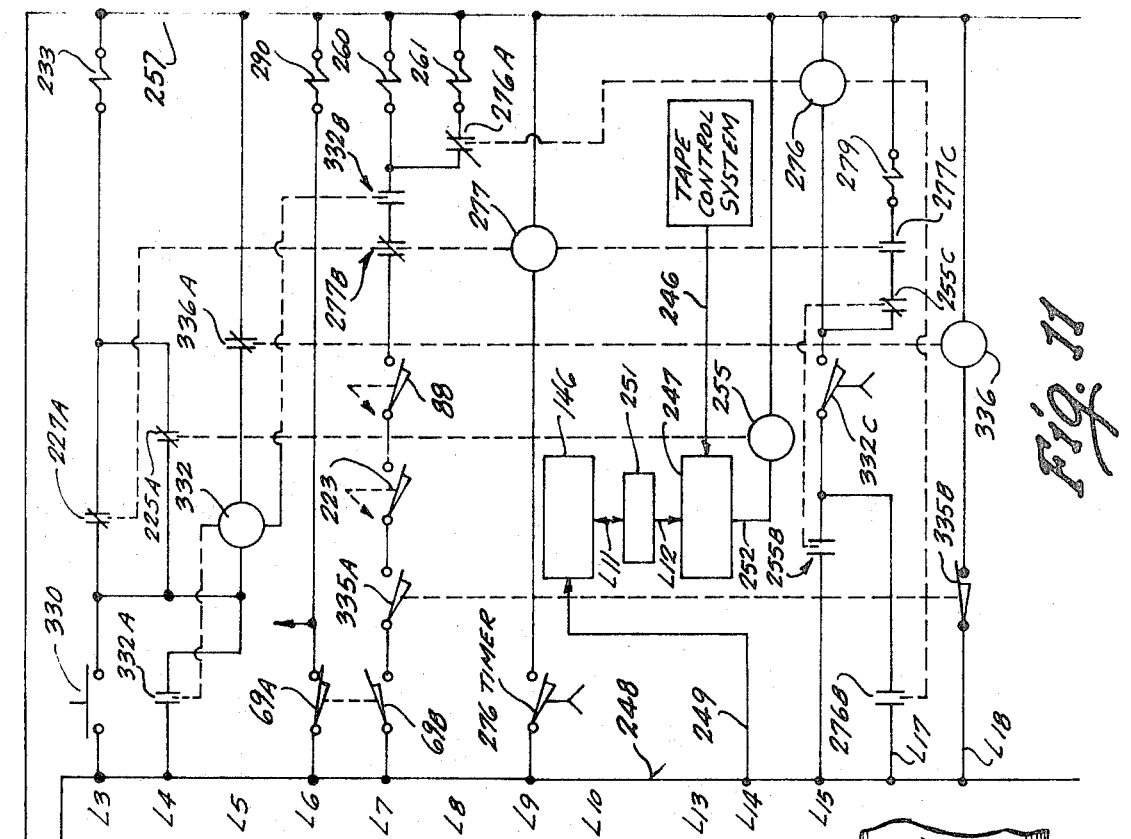
FIG. 11 is a fragmentary portion of the control circuit for effecting electrical coded identification and indexable control of a plurality of different multiple spindle heads relative to a single operating station.

As will be explained, conditions have been established to energize control motor 48 as soon as the index plunger 60 is fully retracted, although control of distance moved is correlated by the electrical control circuits in FIGS. 8 and 11. In FIG. 11, for example, there is illustrated the general mode of operation for initiating and controlling the extent of index movement. Briefly, and as known in the art, general control is in response to a numerical control system (not shown)

both as to workpiece movements, machining operations to be performed, and tools to be used. A signal as to the next required tool to be used is transmitted from the control tape (not shown) by an input conductor 246 connected to provide a binary coded signal to the tool command 247. At the same time, a coincidence signal indicating binary number of the required tool then in the operating station 68 is provided by tool reader 146, FIGS. 2 and 11.

Whenever there is coincidence between the coded tool reader signal 146 and the coded tool command signal 247, line 12, an energized circuit is completed from energized conductor 248, a branch line 249, coincidence path 251, to a branch line 252, line 13. This circuit continues to retain relay 255 energized, line 14, and is completed by another branch line connected to an energized conductor 257. Retention of relay 255 energized actuates associated contacts including one in line 4. Interruption of the coincidence circuit is effected by a different command signal from conductor 246 to provide a different signal to tape command 247 that differs from the signal to reader 146. By calling for a different tool than the one in the operating station 68, the different signal to tool command 247 interrupts the coincidence circuit to deenergize relay 255 and condition a circuit to energize solenoid 233 for withdrawing index plunger 60 and then effecting indexing movement of table 30.

As will be further explained, interruption of coincidence circuit 251, line 12, conditions the electrical circuit, FIG. 11, for effecting withdrawal of index plunger 60 and energization of solenoids 260 and 261 to actuate valve spools 264 and 265 respectively, FIG. 12, to initiate a rapid rate of forward indexing movement. A first circuit is completed from energized pressure line 191, branch line 266, a line in the downwardly energized valve spool 264 to a branch line 268 connected by a control valve and another branch line 274 to effect clockwise rotation of the motor 48. Simultaneously, energization of solenoid 261 effects electrical actuation of valve spool 265 in opposition to the resilient means to connect a return branch line 270 by a valve spool line to another branch line 269 connected by a rapid control valve to tank 192. The return line is completed from the motor 48 by a branch line 271, a control valve 272, and branch line 273 connected by a line 268 and then by a line in the downwardly urged valve spool 264, now energized by solenoid 260, to a line 266.

Indexable movement of index table 30 in a clockwise direction, as described, continues until the next required spindle head moves into the operating station 68 to provide a coded signal to tool reader 146 that reestablishes coincidence with the next tool command signal 247 received from the numerical control system as described. Restoring coincidence between tool reader 146 and tool command 247 again completes coincidence circuit 251 to reenergize relay 255. This again conditions the circuit to deenergize solenoid 233 for restoring the circuit via pressure actuated valve spool 234 and urge plunger 60 inwardly as control circuit 48 for index table 30 is being brought to a full stop.

Simultaneously with a circuit being conditioned to urge index plunger 60 inwardly, reenergization of relay 255 operates to deenergize rapid control solenoid 261 permitting clockwise rotation to continue a slight additional distance in a forward direction at a reduced rate. Upon completion of a forward timed overlap, control relay 276, line 15 in FIG. 11, is energized to in turn effect energization of a reverse control relay 277 for energizing a reverse control solenoid 279. Referring again to FIG. 12, forward control solenoids 260 and 261 have been deenergized to stop clockwise table 30 rotation with a slight overlap before solenoid 279 is energized to initiate reversal at creep rate. By providing a coded identity for each of the spindle heads 51 to 58 inclusive, it is again emphasized that the spindle heads are selectively advanced into the single operating station 68 in any preselected sequence. For example, the 8 separate spindle heads can be programmed to be operated in the order 1, 2, 8, 7, 6, 5, 4 and 3; or in the sequence 8, 7, 1, 2, 4, 3, 6 and 5; or, 3, 6, 2, 5, 1, 4, 8 and 7; or in any other sequence a particular machining program requires. In other words, the coded spindle head identification described and illustrated in the invention enables spindle heads to be identified and positioned any any predetermined random sequence without precluding programming spindle head operation according to a predetermined fixed sequence.

As illustrated in FIG. 2, it will be recalled a single circular positioning key or ring 92 extends around the central portion of the vertical column in position to simultaneously engage keyways respectively presented by rotatable drivers 112 to 118 inclusive, with the latter being respectively associated with the spindle heads 52 to 58 now in storage. Likewise, before indexing the spindle heads relative to the operating station 68, a rotatable drive key 71 carried by driver 70 has been moved into fixed parallelism between the opposite ends 90 and 91 of the continuous ring 92.

Figure 10:
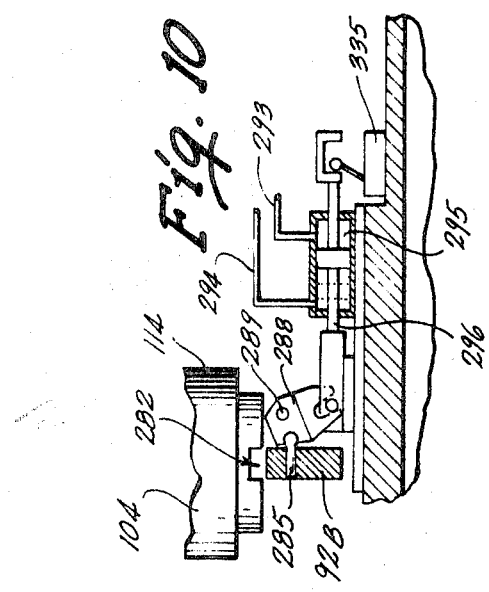
FIG. 10 is a fragmentary view in transverse section through one of the input drivers and showing the releasable track section pivotally retracted to disengaged position.
Figure 9:
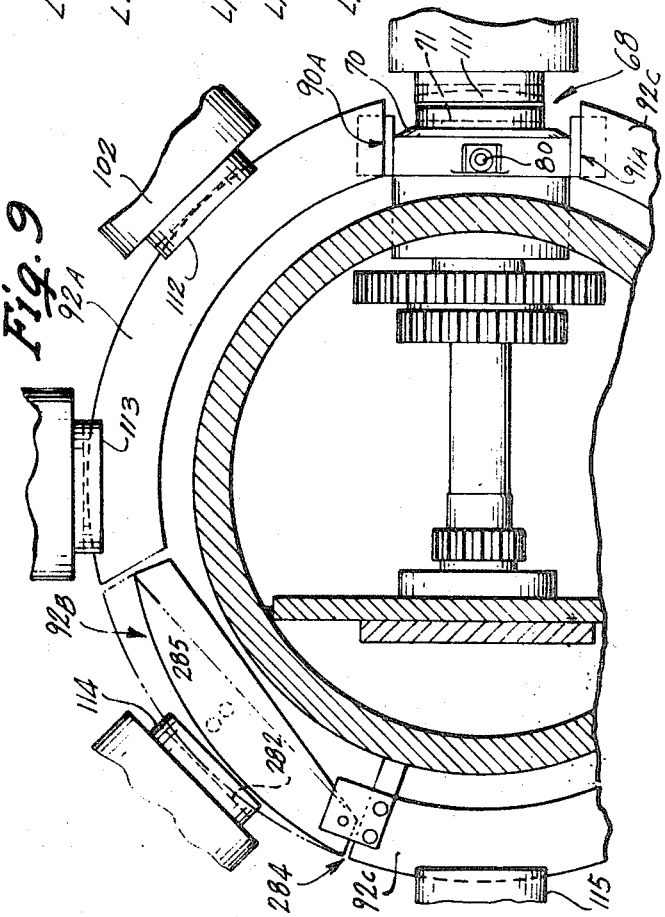
FIG. 9 is a fragmentary plan view of a modified form of the index table and unitary positioning track including a pivotal track retraction section for selectively disengaging one of the spindle heads that is in stored position relative to the single operating station.

In addition to the single unitary, circular positioning ring 92 illustrated and described in FIG. 2, there is provided a preferred modified form of the invention in FIGS. 9 and 10. As thereshown, the unitary positioning ring includes an arcuate, pivotal section 92B that is positioned in predetermined arcuately spaced relationship to the selectively rotatable drive key 71. As previously explained in reference to FIGS. 2 and 6, the single transverse key 71 is carried by the power driven rotatable driver 70 in a manner to rotatably drive the power receiving shaft 111. Whenever keyway 111 is connected to receive power as described, it will be recalled that index support table 30 is locked in preselected indexed position by inward engagement of table index plunger 60, and spindle index plunger 80 is withdrawn. Prior to indexably repositioning the table 30 and spindle heads carried thereby in FIGS. 2 and 6, it will likewise be recalled that the spindle index control plunger 80 is urged inwardly to engage one of the notches 78 or 79 in the output driver 70. This indexing movement forcibly positions the transverse drive key 71 in alignment between the opposite ends 90 and 91 of the continuous circular positioning key or ring 92, as described, to permit subsequent transverse slidable movement therealong of the driven keyways presented by the power receiving shafts 111 to 118 respectively.

To facilitate comparison, the modified form of the invention shown in fragmentary form in FIGS. 9 and 10 is provided with like identified parts excepting for the circular arcuate track sections 92A and 92C positioned adjacent pivotal track section 92B. As now shown in FIGS. 9 and 10, the arcuate track section 92B is pivotally urged radially inward relative to adjacent arcuate section 92A into full disengaged position relative to the keyway 282 in the radially adjacent power receiving shaft 114. With the arcuate track section 92B pivoted inwardly as shown, keyway 282 is completely disengaged to permit independent rotatable adjustment of the associated power receiving shaft 114, power distributor 104, and the spindle head 54 (not shown) driven thereby.

The elongated, stationary arcuate track or key sections 92A and 92C are respectively delimited by the opposite inner ends 90A and 91A. Prior to effecting indexable movement of the index table 30 (not shown) to position the rotary drivers, transverse drive key 71 is again first positioned in parallel alignment between ends 90A and 92A of the respective stationary track sections 92A and 92C. Simultaneously therewith, the retracted arcuate track section 92B is pivotally returned into outwardly keyed engagement with keyway 282 presented by the rotatable driver 114 of associated spindle head 54 (not shown). Automatic means (not shown) may be provided for rotatably returning keyway 282 into aligned position to receive the outwardly pivoting arcuate section 92B. It will be understood, however, that the keyway 282 can be manually realigned with equal facility, particularly since one objective of the retracting section 92B is to provide a manual inspection station.

As shown in FIG. 9, the arcuate section 92B is supported at its leftward end by a pivot pin 284 adjacent the rightward end 285 of the continuous stationary arcuate positioning section 92C. In addition to being pivotally journalled on pivot axis 284, the arcuate segment 92B is provided with a transversely extending actuating pin 285 disposed in spaced parallelism to the pivot axis 284 therefor. As indicated in FIG. 10, actuating pin 285 is provided with an outward spherical end that, in turn, is pivotally engaged by the leftward end of an actuating fork 288 that is pivotally supported by a pin 289 mounted in a stationary support (not shown) carried by the column 25.

As shown in FIG. 12, limit switch 69 is connected to be actuated by a lever arm 67 upon movement of the index plunger 60 for the index table 30, and therefore functions in response to energization of solenoid 233 which controls movement of plunger 60 as described. Whenever the index plunger 60 is in inward latched position, associated limit switch contact 69A, line 6 in FIG. 11, is closed and switch contact 69B, line 7, is in open position to prevent energization of solenoid 260. With limit switch contact 69A closed as shown, solenoid 290, line 6, is maintained energized to complete a circuit for maintaining the arcuate section 92B in pivotally retracted position as shown in FIGS. 9 and 10. Likewise, as shown in FIG. 10, a hydraulic line 291 is then connected by line 294 to actuate cylinder 295 and cylinder shaft 296 inwardly to effect corresponding inward pivotal movement of actuating fork 288 about pivot axis 289. Inward pivotal movement of fork 288 effects pivotal retracting movement of arcuate ring section 92B from engagement with keyway 282 in output shaft 114.

Conversely, energization of solenoid 233 to withdraw table index plunger 60 at the start of an indexing cycle, as will be further explained, effects movement of limit switch contact 69A, line 6, to open position and closure of limit switch contact 69B, line 7. Inasmuch as table index plunger 60 is then being withdrawn, contact 69B, line 7, is then closed to condition a circuit to energize solenoid 260 to initiate the next indexing cycle. At the same time, simultaneous movement of limit switch contact 69A, line 7, to open position effects deenergization of solenoid 290 to reestablish a circuit for returning arcuate section 92B to pivotally outward position bridging the two stationary, arcuate track sections 92A and 92C and engaging keyway 282. It will be noted that rotatable drive key 71 has already been latched into parallel bridging engagement with the inner adjacent ends 90A and 91A of the adjacent arcuate track sections 92A and 92C respectively. Upon pivotal outward movement of retractable track section 92C into arcuate outward position, a continuous circular positioning key has again been established to facilitate a selective spindle head interchange. In clockwise sequence, continuous circular track or key comprises the stationary arcuate section 92A, outwardly pivoted arcuate section 92B, stationary arcuate section 92C and the pivotally latched, rotatable drive key 71. With this condition established, the eight spindle heads 51 to 58 can be selectively interchanged between the single operating station 68 and storage as hereinbefore described.

The hydraulic circuit for initially returning the arcuate section 92B to its outward pivotal position is illustrated in FIG. 12. Upon deenergization of solenoid 290, the associated valve spool 298 is returned to spring biased outward position as shown and redirects the flow of pressure fluid to branch line 293. As shown in FIG. 10, pressure fluid to branch line 293 operates the cylinder 295 to urge the piston to its inward dotted line position. Corresponding leftward or inward movement of the piston shaft 296 pivots the actuating fork 288 for pivotally returning the section 92B to its normal outward position between stationary positioning section 92A. Although it is preferred the invention be operated with pivotal section 92B as described, it is emphasized a single circular positioning ring or key 92 can be used with equal advantage in many applications.

As hereinbefore explained, electrical interlocks are provided to fixedly position both the power drive 70 and the index table 30 in preset angular positions by means of index plunger 80 and table index plunger 60 respectively. To facilitate the description, the electrical disclosures have been reduced to FIGS. 8 and 11 respectively. Principally these illustrate the correllation in function between the power drive and spindle head changing mechanism of the invention as well as the novel method of supplying power to drive a preselected one of a plurality of multiple spindle heads at a single operating station.

With conditions established to effect operation of a spindle head in the operating station, the service plug including valving supply lines 203 and 204 are connected to actuate associated switch 223, line 8, in closed position as shown. Normally open contact 69A is moved to closed position upon movement of the index plunger 60 to engaged position with positioning notch 65 for the spindle head index table 30.

A master start circuit is then energized by depressing master start switch 305 to complete a circuit from an energized conductor 306, across the line 2, and normally closed switch 308 to a relay 309. The circuit is completed by a branch line to another energized line 310 to energized relay 309 to start a motor and hydraulic pump (not shown) for supplying pressure fluid to the hydraulic circuit hereinbefore described. At the same time, energization of relay 309 operates in well-known manner to establish holding circuits by moving associated normally open contacts 309A and 309B to energized closed position. With solenoids 226 and 206, lines 4 and 5, both energized as shown, spindle index plunger 80, FIG. 6, is retracted and service plug lines 203 and 204 in FIG. 12 are connected.

With speed transmission 76, FIG. 3, shifted to the lowest one of its three available speeds, a solenoid 314, line 7, is energized and establishes holding circuits through its associated now energized contacts 314A and 314B. Although the entire speed transmission is not shown, it will be understood that normally open contacts 315B and 316B, lines 10 and 11, function in a similar manner to retain associated speed control relays energized. An energized circuit is now started by depressing switch 320, line 8, connecting energized motor conductor 321 across line 8 and via the now closed contacts to a motor control relay 323 to the energized conductor 310. Energization of motor relay 323 actuates associated contacts 323A and 323B, lines 5 and 9, as well as starting the spindle driving motor 26, FIGS. 1 and 3.

To effect a spindle head interchange as hereinbefore explained, it is first necessary to stop the spindle motor 26, disengage the service plug by retracting support arm 214, and reinsert the index pin 80. It will be recalled that the latter is particularly important in moving the transverse drive key 71 into exact parallelism between the ends of the positioning ring 92, as explained in FIG. 6.

Referring again to FIG. 8, the main spindle drive motor 26 is deenergized by momentarily depressing stop switch 320S in line 8. At the same time, switch 325 is rotated rightward into bridging engagement for completing a circuit from energized conductor 306 to a conductor connected to the solenoid 226. The energized holding circuit is completed from solenoid 226 by a branch conductor to energized line 310 to both position and retain transverse key 71 in fixed parallel position relative to the stationary positioning ring 92. Leftward rotation of switch 327 completes a circuit from energized conductor 306, along line 5, to energize solenoid 206 which is connected by a branch line to energized line 310. As explained, energization of solenoid 206, line 5, also reconnects hydraulic pressure lines 191 and 192, FIG. 12, in order to retract the valving outwardly to the position indicated at dotted line 14. With the foregoing conditions established as described, the control circuit for effecting automatic spindle head interchange is operable in response to that portion of the circuit illustrated in FIG. 11.

Starting a spindle head interchange is begun by holding index start button 330 depressed until solenoid 233 is energized to withdraw table index plunger 60. This circuit is held energized until a holding circuit is established by energization of a relay 332, line L5, to effect actuation of its associated contacts, including the holding circuits effected by closure of contact 332A, line L4.

Outward withdrawal of the table index plunger 60 has already effected opening of limit switch contact 69A. Line L6, to deenergize solenoid 290 to effect return movement of arcuate section 92B to pivotal outward position. Return pivotal movement of arcuate section 92B completes the unitary circular track section, as described, and actuates associated limit switch 335 indicating the spindle head interchange can be effected.

As shown in FIG. 11, outward movement of 92B effects opening of switch contact 335B, line L18, to deenergize relay 336, insuring return of associated contact 336A, line L5, to normally closed position as shown. Simultaneously with opening of contact 335B, associated contact 335A in line L7 is moved to closed position across that line. Reading in sequence across line L7, it will be recalled that conditions have been established to retain all limit switches closed including 69B, 335A, 223 and 88. The energized circuit continues along this line via normally closed reverse control contact 277B, and a now energized contact 332B to energize solenoid 260 for initiating clockwise movement of table 30. A branch control circuit for initiating clockwise movement at a rapid rate is coordinately established by a normally closed contact 276A in a branch vertical conductor to energize rapid control solenoid 261 in line L8.

Both the forward index control solenoid 260 and the rapid control solenoid are retained energized to continue clockwise indexing until coincidence is restored between tool reader 146 and tool command 247. It will be recalled that one of the conditions for initiating a spindle head interchange was operation of the tape control system to actuate tool command 247 with a signal different than the tool reader signal 146. Clockwise indexing movement of the table 30 in advancing the next required spindle head into the operating station 68 reactuates the coded tool reader 146 to restore coincidence with the coded tool command 247. With coincidence restored between 146 and the next required command signal 247, circuit is again completed to reenergize relay 255 in line L14, as hereinbefore described, and actuate the associated contacts. As indicated in FIG. 11, the associated contacts 255A (L4), 255B (L15), and 255C (L17) are all actuated. In particular, closure of normally open contact 255B completes an energized circuit through the still closed contact 332C of index control relay 332 to energize a decelerate and index control relay 276. Immediately, associated normally closed contact 276A (L8) opens to deenergize rapid control solenoid 261 but permits continued energization of solenoid 260 to permit slight additional clockwise movement at creep rate.

After a very slight continued rotation at creep rate, a timer 276T (L9) also responsive to relay 276 is actuated to energize associated control relay 277. Closure of associated normally open contact 277C energizes reverse control solenoid 279 and deenergizes forward creep control solenoid 260 in now interrupted line L7. With the reversedly rotating index control motor 48 being brought to a controlled stop, both of the normally closed contacts 255A and 277A are now returned to energized open position as described. This interrupts the holding circuit across line L3 to deenergize solenoid 233 permitting spring biased return of valve spool 234, FIG. 12, thereby effecting hydraulic reinsertion of index plunger 60. The table index plunger 60 is thus actuated to forcibly engage the index table 30 in timed coincidence with the preselected spindle head carried thereby being brought to forcibly controlled stop at the single operating station 68 hereinbefore described.

Referring again to FIGS. 2 and 8, preferred embodiments of the invention have been shown with the radially disposed input shafts being respectively provided with keyways continuously engaging a circular positioning key or track. The key or track included a rotatable drive key delineating an operating station and being fixedly secured in bridging engagement between fixed, stationary portions of the track. The stationary fixed position key identified principally by the number 92 in FIG. 2 cooperated with the rotatable drive key to maintain all of the keyways presented by the single radially disposed input shaft in fixed angular position to facilitate an interchange of spindle heads between the single operating station and the storage stations. At this point, it will be obvious that the sequentially disposed input drive shafts 111 and 118 inclusive, in FIG. 2, can be provided with drive keys instead of the keyways presented shown and described. In such a case, it will be obvious that a continuous ring or track 92 would be changed to a continuous circular keyway adapted to engage the drive keys then being presented by the rotatable shafts 111 to 118 inclusive. In similar fashion, the rotatable driver 70 would likewise be provided with a keyway to engage one or another of the drive keys then being used. This point is emphasized to illustrate the fact that, even though the present configuration is preferred, the alternative arrangement briefly described can be used with equal advantage in carrying out the spindle head interchange provided by this invention. To read on both arrangements, it will be apparent that the phrases "drive key means" and "driven key means" can be used in connection with the various definitions in the inventors' claims.

In effect, it is considered that the phrase "drive key means" is generic to a consideration that the inner ends of radially disposed input drive shafts 111 to 118 inclusive can be provided either with keyways or keys. It will be understood that the use of keyways at the respective inner ends of the rotatable drive shafts requires a cooperating, intermeshing positioning key or drive track as presently described. Likewise, it will be apparent that the use of "drive keys" on the respective input drivers will require a cooperative intermeshing enlarged circular keyway as alternatively described.

From the foregoing detailed description of the illustrative embodiment set forth herein to exemplify the present invention, it will be apparent that there has been provided an improved spindle head interchange mechanism in combination with novel storage means for a plurality of multiple spindle heads.

Although the illustrative embodiments of the invention have been described in considerable detail for the purpose of disclosing a practical operative structure whereby the invention may be practiced advantageously, it is to be understood that the particular apparatus described is intended to be illustrative only, and that various novel characteristics of the invention may be incorporated in other structural forms without departing from the spirit and scope of the invention as defined in the sub-joined claims.

The principals of this invention having now been fully explained in connection with the foregoing description, we hereby claim as our invention:

1. In a machine having a table carried for selective movement;
   a positioning guide track positioned in spaced parallelism to the path along which said table is indexably movable, said guide track comprising a single power driven rotatable key indexably positioned in releasably parallel alignment between the spaced apart inner ends of stationary elongated positioning guide keys;
   a plurality of multiple spindle heads spaced along said table for indexable movement therewith;
   a plurality of individually rotatable input drive shafts respectively journalled in said spindle heads, said input drive shafts each provided with separate keyways being continuously retained in angular aligned guidable engagement with said continuous positioning guide track;
   positioning drive means connected to move said table including said spindle heads and said input shafts with the keyways thereof being maintained in sliding engagement with said continuous guide track including said indexably positioned drive key;
   control means connected to stop said drive means upon indexable arrival of a preselected spindle head and its associated input drive shaft in such position that the keyway thereof operatively engages said rotatable drive key; and,
   power drive means connected to selectively rotate said drive key for rotating said operatively connected input drive shaft and the multiple spindles journalled in the associated spindle head and connected to be driven by the shaft now moved into driven engagement with said drive key.

2. In a machine tool having rotatable drive means presenting a rotatable drive key;
   first index control means connected to releasably engage said drive means to position said drive key in selected angular alignment at an operating station;
   a pair of spaced apart stationary elongated positioning keys extending in opposite directions from said operating station and disposed in spaced apart parallelism with said angularly aligned rotatable key presented by said rotatable drive means, said spaced apart stationary keys cooperating with said indexably positioned angularly aligned drive key to provide a continuous guide track;
   table support means positioned in spaced parallelism relative to said indexably controlled angularly positioned drive key and said elongated stationary drive keys extending in opposite directions therefrom;
   a plurality of rotatable input drive shafts respectively journalled on said table support means in spaced apart positions therealong, each of said input shafts presenting a keyway disposed in continuous guidable engagement with the continuous positioning guide track effected by indexably positioning said rotatable drive key in parallel alignment between said stationary positioning keys; and,
   second index control means connected to effect selective indexable movement of said table support for selectively positioning a preselected one of said input drive shafts to advance the keyway presented thereby into operative driven engagement with said rotatable drive key.

3. In a machine tool having table selectively movable relative to an operating station;
   a plurality of multiple spindle heads carried by said table for selective indexable movement therewith, said spindle heads respectively provided with one individually rotatable input shaft having a keyway orientated in like angular direction;
   elongated stationary positioning keys carried in fixedly spaced apart positions on opposite sides of said operating station, said positioning keys being respectively adapted to engage the spaced apart keyways respectively presented by said spaced apart input shafts of said spindle heads;

a power driven rotatable driver journalled to rotate about an axis transverse to said operating station;

a transverse drive key secured to the front face of said driver engaging a keyway presented by a rotatable input shaft for selectively driving said spindles of said spindle head in said operating station;

first index control means selectively engageable with said input shaft adapted to position said drive key in spaced alignment between said stationary positioning control keys; and, second index control means connected to selectively index said table for advancing said operating spindle head then in said operating station to advance the input keyway presented thereby into slidable keyed engagement with one of said aligned positioning keys extending from said operating station and simultaneously advancing a stored spindle head having its input keyway then engaging said other positioning key into slidable engagement with said rotatable driven key positioned in said operating station.

4. In a machine tool having a central upstanding column and an enlarged support presenting a circular horizontal way extending about said upstanding column;

an index table mounted on said circular way for selective indexable moveament about said upstanding column;

a transverse power driven horizontal output drive spindle journalled in said column a spaced distance about said index table;

a forwardly extending transverse drive key presented by the output driving end of said spindle;

first index control means adapted to releasably engage the periphery of said spindle to indexably position said forward drive key in horizontal parallel position above the upper face of said index table;

an enlarged circular key extending around said upstanding column in spaced relationship above said table and in horizontal parallel alignment with the opposite ends of said indexably positioned transverse drive key secured to the forward end of said power driven spindle;

a plurality of spindle heads secured in circularly spaced apart positions to said index table for indexable movement therewith about said column;

a corresponding individual input spindle respectively journalled in each of said respective spindle heads and each of said input spindles presenting a transverse keyway respectively engageable with said circular key secured to said column as well as said transverse drive key presented by said output drive spindle journalled in said column;

second index control means connected to selectively index said table for moving a preselected spindle head into an operating position in which said input spindle carried by that head is moved into driven keyed engagement with said drive key in said output spindle; and, control means connected to selectively disconnect said first index control means and operating said drive spindle under power to drive said selectively connected input spindle and operating said spindle head to perform a predetermined plurality of machining operations.

5. In a machine tool having an operating station for receiving a preselected one of a plurality of multiple spindle heads;

a horizontal way supporting said spindle heads of indexable movement relative to said operating station;

a power output spindle journalled in said operating station in transverse parallel position to said horizontal way, and presenting a drive key operative to engage a spindle head in said operating station;

a power controller connected to indexably position said output spindle to maintain said associated drive key parallel to said horizontal way;

stationary positioning keys cooperably aligned with said indexably positioned drive key and adapted to engage spindle heads in storage; and power driven index control means connected to effect selective indexable movement of said spindle heads for effecting interchange of a selected stored spindle head engaging one of said stationary positioning keys with a spindle head engaging said drive key in said operating station.

6. In a machine tool having a horizontal table way and an elongated horizontal guide track positioned in spaced apart parallelism, said elongated guide track comprising a rotatable drive key positioned between spaced apart stationary elongated positioning keys;

means to releasably retain said rotatable key in angularly aligned parallelism between said stationary keys;

a plurality of multiple spindle heads movably carried by said table for indexable movement therealong, each of said spindle heads being provided with one rotatable input shaft having a keyway engaging said parallel guide track;

a power control connected to selectively move said spindle heads along said table and simultaneously move the keyways presented by said associated input shafts along said parallel guide track; and, means to stop said power control for positioning a preselected multiple spindle head along said table with said associated input shaft positioned with its keyway engaging said rotatable drive key.

7. In a machine tool according to claim 6 including power operable clamp means connected to effect forcible power operable clamping of said preselected multiple spindle head at an operating station along said table way to positively retain the keyway presented by said associated input shaft in driven engagement with said rotatable drive key.

8. In a machine tool according to claim 7 including power drive means selectively rotatable and connected to drive said rotatable drive key for rotating said operatively connected input shaft to transmit power for driving said multiple spindle head then clamped in said operating station.

9. In a machine tool according to claim 6 including a continuous circular table interconnecting the opposite outer ends of said horizontal table way to provide a continuous table in combination with a continuous circular guide track operatively interconnecting the opposite outer ends of said horizontal guide track and being positioned in spaced apart parallelism to said continuous circular table way.

10. In a machine tool according to claim 6 including an operating station in proximity to said drive key adapted to receive said spindle head connected to be driven by said drive key;
- a source of air and water at said operating station including disconnect valving therefor;
- air and water transmission lines associated with each spindle head respectively being releasably connectable to receive air and water from said respective sources; and,
- means responsive to positioning of a selected spindle head in said operating station for actuating said valving to operatively connect said source of air and water sources said operating station to said transmission lines of said spindle head then operatively connected in said operating station.

11. In a machine tool having a circular horizontal table way and a circular horizontal guide track positioned in spaced apart parallelism, said guide track comprising a circular fixed portion interrupted by selectively rotary drive key means;
- means to releasably retain said rotary drive key means in parallel alignment with said circular fixed portion;
- plural multiple spindle heads indexably movable along said circular horizontal table way and each spindle head being respectively operative to indexably move a single associated rotatable input shaft having complementary driven key means slidably engaged with said circular horizontal guide track;
- power drive means connected to selectively move said spindle heads along said circular table and simultaneously move the complementary driven key means presented by said associated input shafts along said circular guide track; and,
- means to stop said power drive means for positioning a selected multiple spindle head at an operating station along said circular table with said associated input shaft positioned with its complimentary driven key means engaging said rotatable drive key means.

12. In a machine tool according to claim 10 including power drive means selectively connected to supply power for driving said rotary drive key means and said complementary driven key means of said associated multiple spindle head then positioned in said operating station.

13. In a machine tool according to claim 10 in which said circular horizontal guide track comprises two fixed portions interrupted at one point by said selectively rotary drive key means and interrupted at another point by selectively pivotal means, whereby said pivotal means can be selectively disconnected from one of said spindle heads at the same time power is connected to said rotary drive key means for operating said multiple spindle head then positioned in said operating station.

14. In a machine tool according to claim 11 including an operating station in proximity to said rotary drive key means adapted to releasably receive said spindle head indexably positioned to be driven by said drive key means;
- separate supply sources of air, water and electric power in said operating station including a disconnect service therefor;
- separate input transmission lines for operative connection to receive air, water and electric power and being respectively associated with each of said spindle heads for indexable movement therewith into said operating station; and,
- means responsive to arrival of a preselected spindle head in said operating station operable to actuate said disconnect service to effect an operative connection of said separate supply sources of air, water and electric power to said separate input transmission lines for each provided by said spindle head operatively positioned in said operating station.

15. In a machine tool having a circular table way and circular guide track positioned in spaced apart parallelism, said guide track comprising a stationary fixed portion interrupted by selectively rotary drive key means;
- means to releasably retain said rotary drive key means in parallel alignment with said stationary portion to cooperate therewith in providing a continuous circular guide track;
- a table journalled on said circular table way for indexable movement relative to said circular horizontal guide track;
- a plurality of power receiving drive shafts journalled in radially spaced positions about said table, said drive shafts respectively provided at their inner ends with keyways slidably engaging said circular horizontal guide track; and,
- means to selectively index said table to indexably position said radial drive shafts for moving the keyway of any preselected radial shaft into exact driving engagement with said rotary drive key means and maintaining the keyways presented by said other radial drive shafts in stored angularly aligned engagement with said stationary portion of said circular track.

16. In a machine tool according to claim 15 including means to disconnect said means for retaining said rotary drive key means in parallel alignment; and,
- power operable means selectively connected to drive said rotary drive key means for transmitting power to rotate said drive shaft then having its input keyway connected to be driven by said rotary drive key means.

17. In a machine tool according to claim 15 including a plurality of separate multiple spindle heads respectively secured to said table in outward radially spaced positions and with each of said multiple spindle heads being respectively connected to be driven by a separate one of said power receiving drive shafts journalled in radially spaced positions about said table.

18. In a machine tool having a table way and an elongated guide track positioned in spaced apart parallelism, said elongated guide track comprising a rotatable drive key defining an operating station and being positioned between spaced apart stationary elongated positioning keys;
- means to releasably retain said rotatable key in angular aligned parallelism between said stationary keys to provide a continuous guide track;
- a table support movably carried by said table way for indexable movement relative to said guide track;
- a plurality of input drive shafts rotatably journalled in said table, said drive shafts presenting keyways at their inner ends with said keyways arranged in sequence to slidably engage said elongated guide track;
- power means connected to indexably move said table along said table way and effect corresponding indexable movement of said associated drive shaft keyways along said guide track; and, means to stop said power means for stopping indexable movement of said table to position a preselected one of said drive shaft keyways in driving engagement with said rotatable drive key in said operating station.

19. In a machine tool according to claim 18 including a plurality of multiple spindle heads carried by said table and each of said multiple spindle heads being individually connected to be driven by a respective one of said power driven input shafts.

20. In a machine tool according to claim 18 including a plurality of multiple spindle heads respectively and releasably secured to said table, each of heads being provided with separate independently journalled input driven means, each of said input driven means in one head being adapted to position the outer end of a preselected associated one of said input drive shafts in concentric alignment with the driving input end of that shaft as well as being operatively connected to be driven by that shaft, and, a plurality of different tool spindles journalled in each of said spindle heads and being respectively connected to be rotatably driven by said associated input driven means journalled in said associated spindle head.

21. In a machine tool according to claim 20 including coded tool identifying means associated with each of said spindle heads and a tool reader positioned in spaced proximity to an operating station delineated by said rotatable key, said tool reader adapted to be actuated by said coded tool identifying means associated with each of said spindle heads to provide a coded signal that indicates the coded identity of the spindle head then in the operating station with said associated drive shaft engaging said drive key;

means to provide an input command signal to indicate the identity of the next required spindle head to be connected in said operating station; and, signal control means operative in response to the occurrence of a code identified signal from said tool reader that coincides with the input command from said input command signal and is connected thereupon to actuate said stop means to stop said power means for stopping indexable movement of said table.

* * * * *